United States Patent
Kondo

(10) Patent No.: US 8,224,245 B2
(45) Date of Patent: Jul. 17, 2012

(54) DATA COMMUNICATION DEVICE

(75) Inventor: Hideo Kondo, Moriguchi (JP)

(73) Assignees: Semiconductor Components Industries, LLC, Phoenix, AZ (US); SANYO Semiconductor Co., Ltd., Gunma (JP)

( * ) Notice: Subject to any disclaimer, the term of this patent is extended or adjusted under 35 U.S.C. 154(b) by 242 days.

(21) Appl. No.: 12/753,472

(22) Filed: Apr. 2, 2010

(65) Prior Publication Data
US 2010/0255777 A1    Oct. 7, 2010

(30) Foreign Application Priority Data

Apr. 3, 2009 (JP) ................................ 2009-090881

(51) Int. Cl.
*H04B 5/00* (2006.01)
(52) U.S. Cl. .................... 455/41.1; 455/41.2; 455/74.1; 370/249; 370/282
(58) Field of Classification Search .................. 455/41.1, 455/41.2, 74.1
See application file for complete search history.

(56) References Cited

U.S. PATENT DOCUMENTS 6,567,394 B1 * 5/2003 Arisawa ......................... 370/343
7,049,676 B2 * 5/2006 Tanabe et al. .................. 257/508

FOREIGN PATENT DOCUMENTS

JP        11-234164        8/1999

* cited by examiner

*Primary Examiner* — Tuan H Nguyen
(74) *Attorney, Agent, or Firm* — Morrison & Foerster LLP

(57) ABSTRACT

The IC card is mounted on the read and write device and the first electrostatic induction electrode and second electrostatic induction electrode are formed facing each other. The data signal is outputted from the first transmission and reception circuit to the first electrostatic induction electrode when the data signal is transmitted from the IC card to the read and write device. Then the first electrostatic induction electrode is charged based on the data signal and the electrostatic induction signal of the opposite polarity is induced at the second electrostatic induction electrode. The inverted data signal appears at the second electrostatic induction electrode. The second transmission and reception circuit of the read and write device receives and amplifies the inverted data signal, leading to the non-contact data communication with lower energy consumption and the lower cost.

9 Claims, 3 Drawing Sheets wave form of the first static induction electrode 11 wave form on the wiring 125 input wave form of the inverter INV1 output wave form of the inverter INV1

DATA COMMUNICATION DEVICE

CROSS-REFERENCE OF THE INVENTION

This application claims priority from the Japanese Patent Application No. 2009-090881, the content of which is incorporated therein by reference in its entirety.

BACKGROUND OF THE INVENTION

1. Field of Invention

This invention is related to the data communication device, especially to the date communication device used for the data communication between an IC card and an IC Card read and write device.

2. Description of the Related Art

An antenna is formed on an IC card side when data communication is held between a non-contact type IC card and a read and write device of the IC card in the conventional designs. The antenna is configured from a conduction line loop and data communication is held by using induced electromotive force generated by applying an electric current to the loop. This type of data communication device is disclosed in Japanese Patent Application No. Hei 11-234164.

However, the application of an electric current to the conduction loop is required in the data communication device described above, which leads to a large consumption of electric power. The large consumption of the electric power is a serious problem especially for small scale devices which require low power consumption.

The shape of the antenna, which is made of the conduction loop, should be optimized depending on the frequency to obtain the maximum efficiency in the gain and radiation power. It leads to a problem of increased surface area of the antenna on the IC card as well as an increase of manufacturing cost.

SUMMARY OF THE INVENTION

The invention provides a data communication device that includes a first electrostatic induction electrode, a second electrostatic induction electrode facing the first electrostatic induction electrode so as to promote electrostatic induction between the first and second electrostatic induction electrodes, a reception and amplification circuit connected to the first electrostatic induction electrode, and a wiring connecting the reception and amplification circuit and the first electrostatic induction electrode. The reception and amplification circuit receives and amplifies an electrostatic induction signal generated at the first electrostatic induction electrode in response to a data signal applied to the second induction electrode.

DETAILED DESCRIPTION OF THE INVENTION

The data communication device of an embodiment of this invention executes the dual direction data communication between an IC card and a read and write device using electrostatic induction. The IC card and the read and write device are either in contact or located close to each other. However, the electrodes of these devices are not contacted. Therefore, the data communication is essentially a non-contact communication. First, the basic configuration of the data communication device of this invention will be explained. The detailed explanation of the circuits of the device will follow.

Figure 1A:
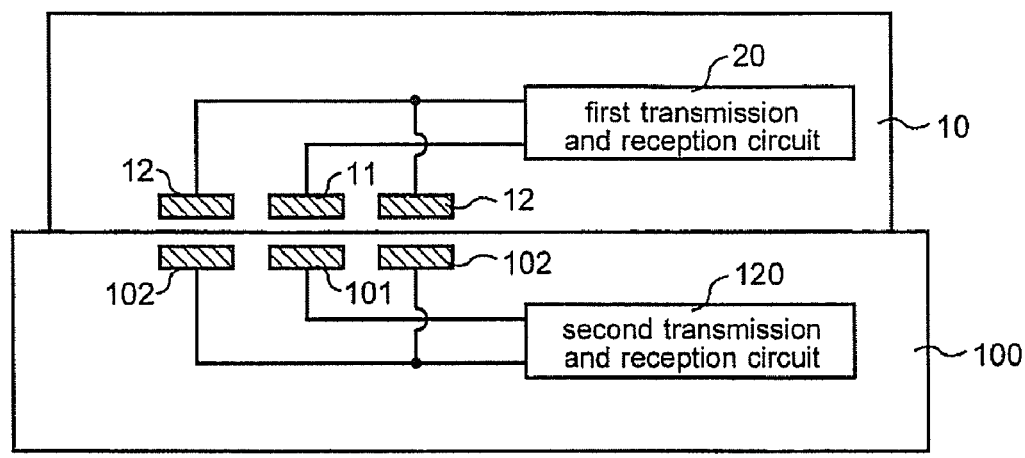
FIGS. 1A and 1B show the configuration of the data communication device of an embodiment of the invention.
Figure 1B:
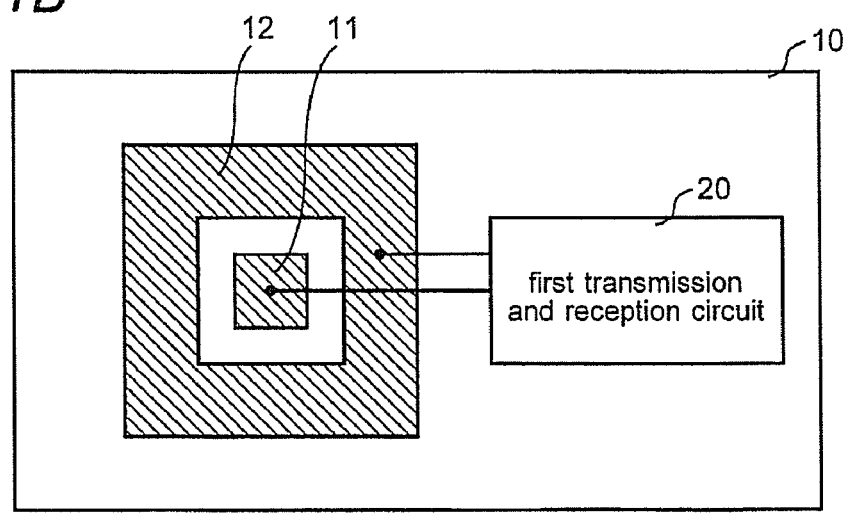

FIGS. 1A and 1B show the IC card mounted on the read and write device. FIG. 1A is the side view (see through view), and FIG. 1B is the plan view (see through view) of the device.

As it is shown in the figure, a first electrostatic induction electrode 11, a first feedback electrode 12 and a first transmission and reception circuit 20 are buried in an IC card made from a resin. A second electrostatic induction electrode 101, a second feedback electrode 102 and a second transmission and reception circuit 120 are also buried in a read and write device 100 made from a resin. Therefore, these electrodes are buried in the resin, a dielectric material, and are not exposed.

The IC card 10 is mounted on the read and write device 100, where the first electrostatic induction electrode 11 and the second electrostatic induction electrode 101 are facing each other with the resin in between and where the feedback electrode 12 and the second feedback electrode 102 are facing each other with the resin in between. The first feedback electrode 12 is disposed close to the first electrostatic induction electrode 11 and the second feedback electrode 102 is disposed close to the second electrostatic induction electrode 101. The IC card 10 is mounted on the read and write device 100, as shown in FIGS. 1A and 1B. However, it is also possible that the IC card 10 is inserted into a slit formed in the read and write device 100.

A data signal is sent from a first transmission and reception circuit 20 to the first electrostatic induction electrode 11 when the data signal is sent from the IC card 10 to the read and write device 100. Then, the first electrostatic induction electrode 11 is charged according to the data signal and electric charges of the opposite polarity are induced by the electrostatic induction at the first electrostatic induction electrode 11 and the second electrostatic induction electrode 101 facing the first electrostatic induction electrode 11. When the data signal is a serial data signal, where H level and L level signals repeat themselves, the data signal with H level and L level signals repeating reversely appears at the second electrostatic induction electrode 101. The second transmission and reception circuit 120 of the read and write device 100 receives and amplifies this reversed data signal.

A data signal is sent from a second transmission and reception circuit 120 to the second electrostatic induction electrode 101 when the data signal is sent from the read and write device 100 to the IC card 10. Then, the second electrostatic induction electrode 101 is charged according to the data signal and electric charges of the opposite polarity are induced by the electrostatic induction at the second electrostatic induction electrode 101 and the first electrostatic induction electrode 11 facing the second electrostatic induction electrode 101. When the data signal is a serial data signal, where H level and L level signals repeat themselves, the data signal with H level and L level signals repeating reversely appears at the first electrostatic induction electrode 11. The first transmission and reception circuit 20 of the read and write device 100 receives and amplifies this reversed data signal.

The dual directional communication between the IC card and the read and write device 100 is possible in this way.

The ground potential of the IC card 10 and read and write device 100 are not necessarily the same because the IC card 10 and the read and write device 100 are electrically insulated from each other. The data reception error can take place when the ground potential of the IC card 10 and the read and write device 100 are not the same.

The first feedback electrode 12 and the second feedback electrode 102 are formed in order to avoid the date reception error. The data signal received and amplified by the first transmission and reception circuit 20 is applied to the first feedback electrode 12 through feedback. And the data signal received and amplified by the second transmission and reception circuit 120 is applied to the second feedback electrode 102 through feedback.

The data signal received and amplified by the second transmission and reception circuit 120 of the read and write device 100 is applied to the second feedback electrode 102 when the data signal is sent from the IC card 10 to the read and write device 100. In this case, the signal with the same polarity as that of the original data signal reappears at the first electrostatic induction electrode 11 of the IC card 10 due to the electrostatic induction.

Then, an inverted signal of the reappeared signal appears at the second electrostatic induction electrode 101 of the read and write device 100 because of the further electrostatic induction caused by the reappeared signal. That is, the amplitude of the data signal at the second electrostatic induction electrode 101 is strengthened. This can prevent the reception error even if there is a difference more or less between the ground potential of the IC card 10 and the ground potential of the read and write device 100.

The date signal is sent from the read and write device 100 to the IC card 10 in the same way. It is preferable to dispose the first feedback electrode 12 in such a way that it surrounds the first electrostatic induction electrode 11 in the plan view as shown in FIG. 1B for strengthening the capacity coupling between the first feedback electrode 12 and the second electrostatic induction electrode 101 located in diagonal direction so that the electrostatic induction between the two can easily take place, in order to enhance the feedback effect described above. Likewise, it is preferable to dispose the second feedback electrode 102 in such a way that it surrounds the second electrostatic induction electrode 101 for strengthening the capacity coupling between the second feedback electrode 102 and the first electrostatic induction electrode 11 located in diagonal direction so that the electrostatic induction between the two can easily takes place.

Figure 2:
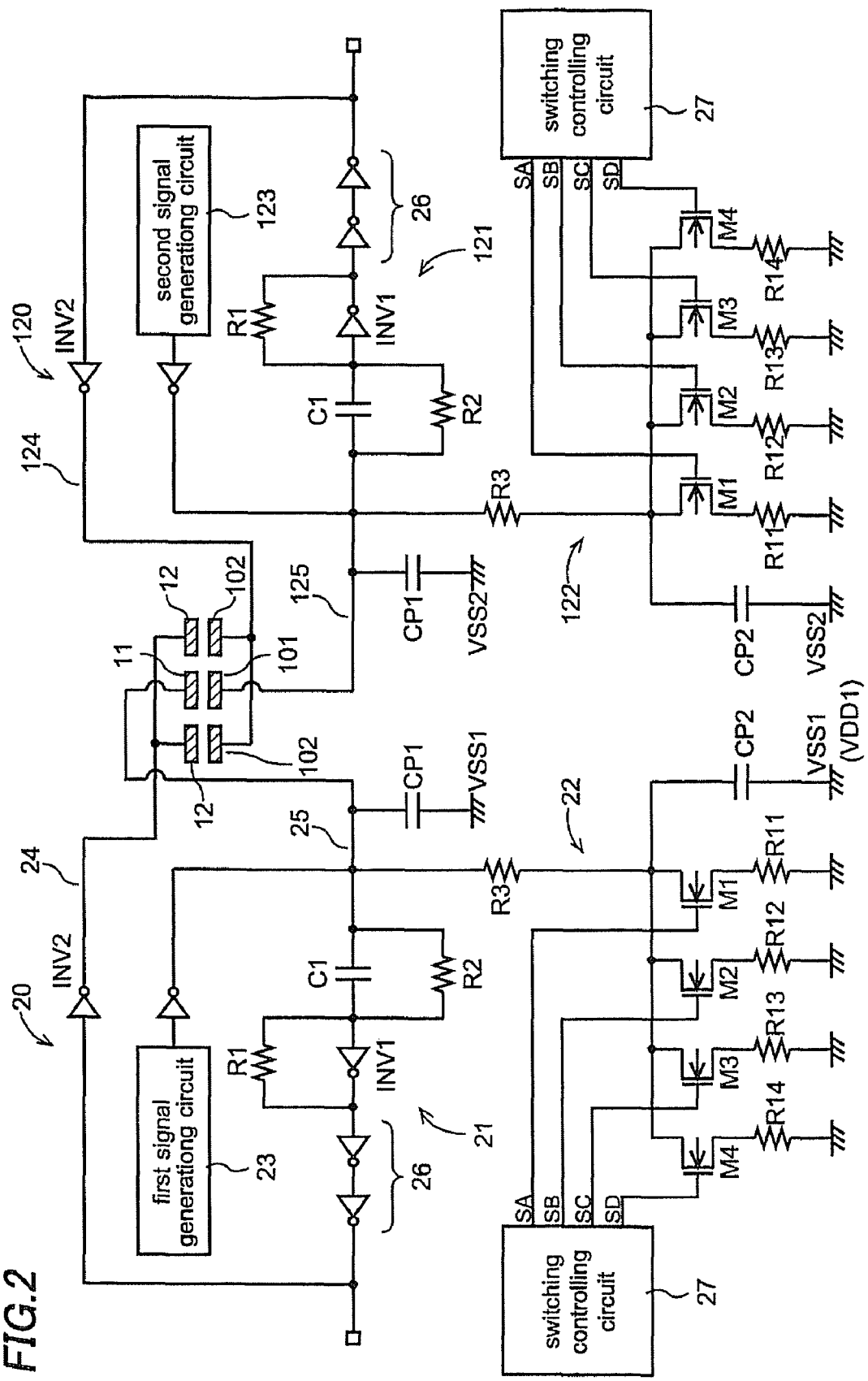
FIG. 2 is a circuit diagram of the data communication device of an embodiment of the invention.

FIG. 2 is a circuit diagram of a data communication device of this embodiment. The first transmission and reception circuit 20 of the IC card 10 has a first reception and amplification circuit 21, a first input threshold adjusting circuit 22, a first signal generating circuit 23, and a first feedback circuit 24. Also, the second transmission and reception circuit 120 of the read and write device 100 has a second reception and amplification circuit 121, a second input threshold adjusting circuit 122, a second signal generating circuit 123, and a second feedback circuit 124. The first and second transmission and reception circuits 20, 120 have basically the same configuration. The configuration of the first transmission and reception circuit 20 will be explained below.

The first reception and amplification circuit 21 is connected to the first electrostatic induction electrode 11 through a wiring 25. The first reception and amplification circuit 21 receives and amplifies the electrostatic induction signal that is generated at the electrostatic induction electrode 11 in response to a data signal applied to the second electrostatic induction electrode 101 located at the read and write device side. The first reception and amplification circuit 21 is configured from an input capacitor C1, an inverter INV1 and a feedback resistor R1.

The input capacitor C1 has first and second electrodes, and the first electrode is connected to the first electrostatic induction electrode 11 through the wiring 25. Therefore, the electrostatic induction signal described above is inputted to the first electrode of the input capacitor C1 through the wiring 25.

The inverter INV1 has an input terminal and an output terminal. The second electrode of the input capacitor C1 is connected to the input terminal. It is preferable that the inverter INV1 is configured from the CMOS inverter so as to lower the power consumption. The feedback resistor R1 is connected between the input terminal and the output terminal of the inverter INV1. Therefore, the voltage of the input terminal INV1 is set around the input threshold value of the inverter INV1. The output signal of the inverter INV1 is outputted through a buffer circuit 26.

The first input threshold adjusting circuit 22 has a function to make the input threshold of the inverter INV1 changeable. The first input threshold adjusting circuit 22 has a by-pass resistor R2, a switching control circuit 27, which controls the switching elements of MOS transistors M1-M4, and a capacitor isolation resistor R3.

The by-pass resistor R2 connects the input terminal of the inverter INV1 and the wiring 25, forming the electricity flow from the output terminal of the inverter INV1 to the wiring 25. Each source of the MOS transistors M1-M4 is connected to the first ground potential VSS1 through the source resistors R11-R14 and each drain is connected to the wiring 25 through capacitor isolation resistor R3. The capacitor isolation resistor R3 is formed to prevent the parasitic capacitance CP2 attached to the drains of the MOS transistor M1-M4 to apply to the wiring 25.

The wiring 25 has own parasitic capacitance CP1. If the drains of the MOS transistors M1-M4 are directly connected to the wiring 25, the capacitance value of the parasitic capacitance CP2 is added to the capacitance value of the parasitic capacitance CP1, increasing the total capacitance value of the parasitic capacitance of the wiring 25. Therefore, the electrostatic induction signal from the first electrostatic induction electrode 11 is decreased. The influence from the parasitic capacitance CP2 on the wiring 25 is minimized by forming the capacitance isolation resistor R3.

A switching control circuit 27 controls on/off of the MOS transistors M1-M4 and the control signals SA-SD are applied to the gates of the MOS transistors M1-M4. When the control signals SA-SD are at high level, the corresponding MOS transistors M1-M4 are on and when the control signals SA-SD are at low level, the corresponding MOS transistors M1-M4 are off That is, the control signals SA-SD determine the number of the transistors, that are turned on among the MOS transistors M1-M4.

When all the MOS transistors M1-M4 are off, an electric current path is not formed from the output terminal of the inverter INV1 to the first ground potential VSS1, and therefore, the threshold of the inverter INV1 does not change. However, when one of the MOS transistors M1-M4 is turned on, an electric current path is formed from the output terminal of the inverter INV1 to the first ground potential VSS1 through the transistor that has been turned on. Therefore, the threshold of the inverter INV1 decreases. As the number of MOS transistors that are tuned on increases among the MOS transistors M1-M4, the electric current going through this electric current path goes up, leading to the further reduction of the threshold of the inverter INV1.

The input threshold of the inverter INV1 can be adjusted by forming the first input threshold adjusting circuit 22, keeping the electric current consumption of the first reception and amplification circuit 21 minimum. The electric current going through the inverter INV1 increases, making the electric current consumption larger, when the signal around the input threshold of the inverter INV1 is constantly inputted. The electric current going through the inverter INV1 can be reduced by adjusting the input threshold of the inverter INV1 using the first input threshold adjusting circuit 22, namely, by differentiating the level of the input signal and the input threshold.

The first input threshold adjusting circuit 22 is formed at the side where the ground potential VSS1 is disposed and it makes the input threshold of the inverter INV1 adjustable towards the reduction of the threshold. It is also possible to form the first input threshold adjusting circuit 22 at the side where the source voltage VDD1 is disposed and to make the input threshold of the inverter INV1 adjustable towards the increase of the threshold. As for the switching controlling circuit 27, switching can also be controlled through a program using a microcomputer built in the IC card 10.

The first feedback circuit 24 has a configuration where the output signal of the inverter INV2 is sent back to the feedback electrode 12. That is the output signal of the inverter INV1 of the first reception and amplification circuit 21 is inputted to the feedback inverter INV2 through a buffer circuit 26. The output signal of the feedback inverter INV2 is applied to the first feedback electrode 12.

Suppose the data signal is transmitted from read and write device 100 to the IC card 10. The data signal which has been inverted and amplified by the reception and amplification circuit 21 of the IC card 10 is further inverted by the feedback inverter INV2 and applied to the first feedback electrode 12. Therefore, the induction charges of opposite polarity appear at the second electrostatic induction electrode 101 of the read and write device 100. That is, a signal that has the same polarity as that of the original data signal from the read and write device 100 reappears.

Then, an inverted signal of the reappeared signal appears at the first electrostatic induction electrode 11 of the IC card 10 because of the further electrostatic induction caused by the reappeared signal. That is, the amplitude of the data signal at the first electrostatic induction electrode 11 is strengthened. This can prevent the reception error even if there is a difference more or less between the first ground potential VSS1 of the IC card 10 and the second ground potential VSS2 of the read and write device 100.

The detailed operation of the device when the data signal is sent from the IC card 10 to the read and write device 100 is explained below based on FIGS. 3A, 3B and 3C. The same operation will take place when data is sent from the read and write device 100 to the IC card 10.

Figure 3A:
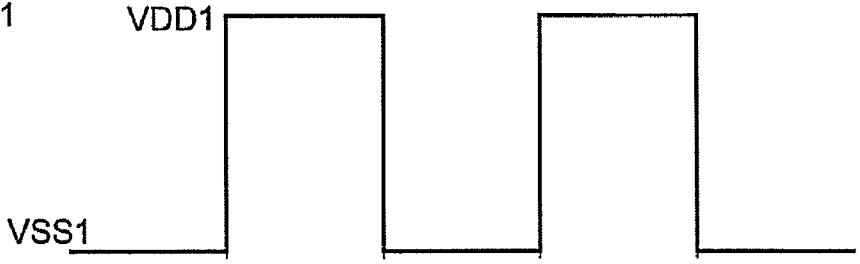
FIGS. 3A, 3B, 3C and 3D are wave form charts for the operation of the data communication device of an embodiment of the invention.
Figure 3B:
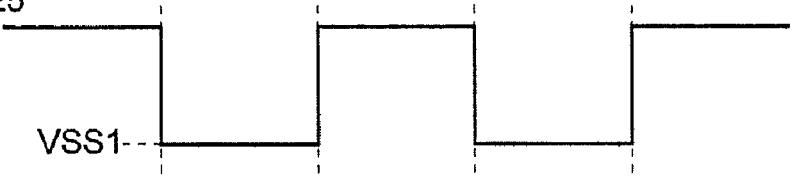

The data signal that repeats H level and L level signals is applied to the first electrostatic induction electrode 11 from the first signal generation circuit 23 of the IC card 10 as shown in FIG. 3A. H level is the source voltage VDD1 of the IC card 10 and the L level is the first ground potential VSS1.

The induction charges of the opposite polarity appear at the second electrostatic induction electrode 101 of the read and write device 100 due to the electrostatic induction. The electrostatic induction signal caused by the electrostatic charges becomes the signal inverted from the data signal and is transmitted to the wiring 125 connected to the second electrostatic induction electrode 101. The electrostatic induction signal on the wiring 125 is the signal inverted from the original data signal as shown in FIG. 3B. The amplitude of the signal is reduced because of the influence from the parasitic capacitance CP1 of the wiring 125.

The electrostatic induction signal at the wiring 125 is inverted and amplified by the second reception and amplification circuit 121. That is, the electrostatic induction signal is changed to a differential wave form by going through the input capacitor C1. This differential wave form gets smoother, as shown in FIG. 3C, by increasing the capacitance value of the input capacitor C1 and it can be inputted to the inverter INV1.

Figure 3C:
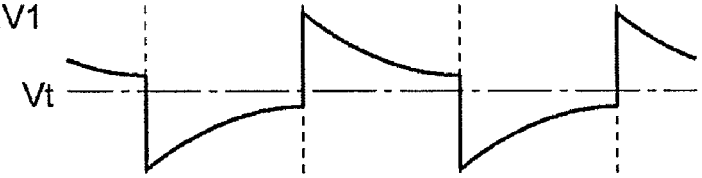
Figure 3D:
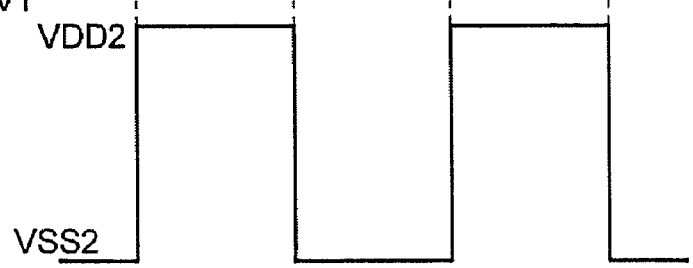

The symbol Vt in FIG. 3C signifies the input threshold of the inverter INV1. That is, as it is showed in FIG. 3C and FIG. 3D, the output signal of the inverter INV1 is at H level, when the input signal is lower than the threshold Vt and the output signal of the inverter INV1 is at L level, when the input signal is higher than the threshold. In this case, the H level is the second source voltage VDD2 of the read and write device 100 and the L level is the second ground potential VSS2. The electrostatic induction signal is inverted and amplified by the inverter INV1 in this way and the data signal sent from the IC card reappears. Accordingly, the data communication device of this embodiment enables the date communication with low power consumption and low manufacturing cost.

The data transmissions are done in dual directions between the IC card 10 and the read and write device 100 in the embodiment described above. This invention is, however, not limited to this embodiment. It can be widely used in the non-contact data transmission.

It is also possible to use only the necessary circuit configurations among various circuit configurations described in the embodiment above. For example, both the IC card 10 and the read and write device 100 have the first and second transmission and reception circuits 20 and 120 of the same configurations respectively. However, when this embodiment is applied to the data transmission of single direction, only the circuit configurations required for the single direction data transmission (for example, the first signal generating circuit 23 formed at the side the IC card and the reception and amplification circuit 121 formed at the side of the read and write device 100) are necessary to be formed.

What is claimed is:
1. A data communication device comprising:
a first electrostatic induction electrode;
a second electrostatic induction electrode facing the first electrostatic induction electrode so as to promote electrostatic induction between the first and second electrostatic induction electrodes;
a reception and amplification circuit connected to the first electrostatic induction electrode; and
a wiring connecting the reception and amplification circuit and the first electrostatic induction electrode,
wherein the reception and amplification circuit receives and amplifies an electrostatic induction signal generated at the first electrostatic induction electrode in response to a data signal applied to the second induction electrode, and
in plan view of the data communication device, the first electrostatic induction electrode takes a form of an island filled with a conductive material.
2. The data communication device of claim 1, further comprising a signal generating circuit connected to the first electrostatic induction electrode through a wiring.
3. A data communication device comprising:
a first electrostatic induction electrode;
a second electrostatic induction electrode facing the first electrostatic induction electrode so as to promote electrostatic induction between the first and second electrostatic induction electrodes;
a reception and amplification circuit connected to the first electrostatic induction electrode; and a wiring connecting the reception and amplification circuit and the first electrostatic induction electrode, wherein the reception and amplification circuit receives and amplifies an electrostatic induction signal generated at the first electrostatic induction electrode in response to a data signal applied to the second induction electrode, and the reception and amplification circuit comprises an input capacitor comprising a first electrode and a second electrode, an inverter comprising an input terminal and an output terminal, and a feedback resistor connected between the input terminal and the output terminal of the inverter, the first electrode of the input capacitor is connected to the first electrostatic induction electrode through the wiring so that the electrostatic induction signal is applied to the first electrode, and the input terminal of the inverter is connected to the second electrode of the input capacitor.

4. The data communication device of claim 3, further comprising an input threshold adjusting circuit adjusting an input threshold of the reception and amplification circuit.

5. The data communication device of claim 4, wherein the input threshold adjusting circuit comprises a by-pass resistor connecting the input terminal of the inverter and the wiring and forming an electric current path from the output terminal of the inverter to the wiring, a plurality of switching elements connected between the wiring and a ground or a source, and a switching controlling circuit switching the switching elements.

6. The data communication device of claim 5, wherein the switching elements are connected to the wiring through a capacitor isolation resistor.

7. A data communication device comprising:
a first electrostatic induction electrode;
a second electrostatic induction electrode facing the first electrostatic induction electrode so as to promote electrostatic induction between the first and second electrostatic induction electrodes;
a reception and amplification circuit connected to the first electrostatic induction electrode, the reception and amplification circuit receiving and amplifying an electrostatic induction signal generated at the first electrostatic induction electrode in response to a data signal applied to the second induction electrode;
a wiring connecting the reception and amplification circuit and the first electrostatic induction electrode; and
a feedback electrode disposed adjacent the first electrostatic induction electrode, an output signal of the reception and amplification circuit being applied to the feedback electrode so that an induction charge is induced at the second electrostatic induction electrode due to electrostatic induction and a strength of the electrostatic induction signal at the first electrostatic induction electrode is increased.

8. The data communication device of claim 7, wherein the first electrostatic induction electrode is surrounded by the feedback electrode in plan view of the data communication device.

9. A data communication device comprising:
a first device comprising a first electrostatic induction electrode embedded therein; and
a second device comprising a second electrostatic induction electrode embedded therein and detachably placed on or in the first device so that electrostatic induction is promoted between the first and second electrostatic induction electrodes,
wherein the first device further comprises a reception and amplification circuit connected to the first electrostatic induction electrode and a feedback electrode disposed to surround the first electrostatic induction electrode,
the reception and amplification circuit receives and amplifies an electrostatic induction signal generated at the first electrostatic induction electrode in response to a data signal applied to the second induction electrode, and
an output signal of the reception and amplification circuit is applied to the feedback electrode so that an induction charge is induced at the second electrostatic induction electrode which in turn increases a level of the electrostatic induction signal originally generated at the first electrostatic induction electrode in response to the data signal.

\* \* \* \* \*